US005791142A

United States Patent [19]

Layne et al.

[11] Patent Number: 5,791,142

[45] Date of Patent: Aug. 11, 1998

[54] HYDRAULIC CONTROL VALVE SYSTEM WITH SPLIT PRESSURE COMPENSATOR

[75] Inventors: Michael C. Layne, Waterford; Raud A. Wilke, Dousman; Leif Pedersen, Waukesha; Michael J. Paik, Delafield, all of Wis.

[73] Assignee: Husco International, Inc., Waukesha, Wis.

[21] Appl. No.: 826,184

[22] Filed: Mar. 27, 1997

[51] Int. Cl.$^6$ .................................................... F16D 31/02

[52] U.S. Cl. ............................................... 60/450; 91/446

[58] Field of Search ............................ 91/448, 446, 447, 91/517, 518; 60/450, 452, 426; 137/569, 569.13

[56] References Cited

U.S. PATENT DOCUMENTS

| | | | |
|---|---|---|---|
| 3,685,540 | 8/1972 | Wilke | 137/596.13 |
| 3,777,773 | 12/1973 | Tolbert | 137/596.13 |
| 4,693,272 | 9/1987 | Wilke | 137/596 |
| 4,798,126 | 1/1989 | Budzich | 137/596.13 |
| 4,842,019 | 6/1989 | Rousset et al. | 137/596 |
| 5,000,001 | 3/1991 | Christensen et al. | 60/450 |
| 5,067,389 | 11/1991 | St. Germain | 91/446 |
| 5,138,837 | 8/1992 | Obertrifter et al. | 60/426 |
| 5,146,747 | 9/1992 | Sugiyama et al. | 60/452 |
| 5,161,373 | 11/1992 | Morikawa et al. | 60/484 |
| 5,211,196 | 5/1993 | Schwelm | 137/596.2 |
| 5,305,789 | 4/1994 | Rivolier | 137/596 |
| 5,333,449 | 8/1994 | Takahashi et al. | 91/446 |
| 5,415,199 | 5/1995 | Claudinon et al. | 137/596 |
| 5,579,642 | 12/1996 | Wilke et al. | 60/426 |

FOREIGN PATENT DOCUMENTS 58-31486 7/1983 Japan .

*Primary Examiner*—Edward K. Look
*Assistant Examiner*—Bijan N. Karimi
*Attorney, Agent, or Firm*—Quarles & Brady

[57] ABSTRACT

An improved pressure-compensated hydraulic system for feeding hydraulic fluid to one or more hydraulic actuators. A remotely located, variable displacement pump provides an output pressure equal to a control input pressure plus a constant margin. A pressure compensation system requires that a load-dependent pressure be provided to the pump input through a load sense circuit. An isolator transmits the load-dependent pressure to the pump control input, while preventing fluid from leaving the load sense circuit and flowing to the remotely located pump. A valve section, which controls the fluid flow between the pump and actuator, has a pressure compensating valve with a piston and spool controlling a pressure differential across a main control valve orifice by moving within a bore in response to a pressure differential between a pump supply pressure and the load sense pressure. The piston and spool also separate to shut off fluid flow to the actuator when the back pressure from the load exceeds the pump supply pressure.

21 Claims, 6 Drawing Sheets

HYDRAULIC CONTROL VALVE SYSTEM WITH SPLIT PRESSURE COMPENSATOR

FIELD OF THE INVENTION

The present invention relates to valve assemblies which control hydraulically powered machinery; and more particularly to pressure compensated valves wherein a fixed differential pressure is to be maintained to achieve a uniform flow rate.

BACKGROUND OF THE INVENTION

The speed of a hydraulically driven working member on a machine depends upon the cross-sectional area of principal narrowed orifices of the hydraulic system and the pressure drop across those orifices. To facilitate control, pressure compensating hydraulic control systems have been designed to set and maintain the pressure drop. These previous control systems include sense lines which transmit the pressure at the valve workports to the input of a variable displacement hydraulic pump which supplies pressurized hydraulic fluid in the system. The resulting self-adjustment of the pump output provides an approximately constant pressure drop across a control orifice whose cross-sectional area can be controlled by the machine operator. This facilitates control because, with the pressure drop held constant, the speed of movement of the working member is determined only by the cross-sectional area of the orifice. One such system is disclosed in U.S. Pat. No. 4,693,272 entitled "Post Pressure Compensated Unitary Hydraulic Valve", the disclosure of which is incorporated herein by reference.

Because the control valves and hydraulic pump in such a system normally are not immediately adjacent to each other, the changing load pressure information must be transmitted to the remote pump input through hoses or other conduits which can be relatively long. Some hydraulic fluid tends to drain out of these conduits while the machine is in a stopped, neutral state. When the operator again calls for motion, these conduits must refill before the pressure compensation system can be fully effective. Due to the length of these conduits, the response of the pump may lag, and a slight dipping of the loads can occur, which characteristics may be referred to as the "lag time" and "start-up dipping" problems.

In some types of hydraulic systems, the "bottoming out" of a piston driving a load could cause the entire system to "hang up". This could occur in such systems which used the greatest of the workport pressures to motivate the pressure compensation system. In that case, the bottomed out load has the greatest workport pressure and the pump is unable to provide a greater pressure; thus there would no longer be a pressure drop across the control orifice. As a remedy, such systems may include a pressure relief valve in a load sensing circuit of the hydraulic control system. In the bottomed out situation, the relief valve opens to drop the sensed pressure to the load sense relief pressure, enabling the pump to provide a pressure drop across the control orifice.

While this solution is effective, it may have an undesirable side effect in systems which use a pressure compensating check valve as part of the means of holding substantially constant the pressure drop across the control orifice. The pressure relief valve could open even when no piston was bottomed out if a workport pressure exceeded the set-point of the load sense relief valve. In that case, some fluid could flow from the workport backwards through the pressure compensating check valve into the pump chamber. As a result, the load could dip, which condition may be referred to as a "backflow" problem.

For the foregoing reasons, there is need for means to reduce or eliminate the problems of lag time, start-up dipping and backflow in some hydraulic systems.

SUMMARY OF THE INVENTION

The present invention is directed toward satisfying those needs.

A hydraulic valve assembly for feeding hydraulic fluid to at least one load includes a pump of the type that produces a variable output pressure which at any time is the sum of input pressure at a pump control input port and a constant margin pressure. A separate valve section controlling the flow of hydraulic fluid from the pump to a hydraulic actuator is connected to one of the loads and is subjected to a load force that creates a load pressure. The valve sections are of a type in which the greatest load pressure is sensed to provide a load sense pressure which is transmitted to the pump control input port.

Each valve section has a metering orifice through which the hydraulic fluid passes from the pump to the respective actuator. Thus, the pump output pressure is applied to one side of the metering orifice. A pressure compensating valve within each valve section provides the load sense pressure at the other side of the metering orifice, so that the pressure drop across the metering orifice is substantially equal to the constant pressure margin. The pressure compensator has a spool and a piston that slide within a bore and are biased apart by a spring. The spool and piston divide the bore into first and second chambers. The first chamber communicates with the other side of the metering orifice and the second chamber is in communication with the load sense pressure. As a result, changes in a pressure differential between the first and second chambers causes movement of the spool and piston, where the magnitude and direction of that pressure differential determines positions of the spool and piston within the bore.

The bore has an output port from which fluid is supplied to the respective hydraulic actuator. The position of the spool within the bore controls the size of the output port and thus the pressure differential across the metering orifice. That flow is enabled when pressure in the first chamber is greater than pressure in the second chamber and is disabled when the pressure in the second chamber is significantly greater than the pressure in the first chamber. Although the piston and spool are biased apart by a spring, each is unbiased with respect to walls of the first and second chambers, except by pressure within those chambers.

DETAILED DESCRIPTION OF A PREFERRED EMBODIMENT

Figure 1:
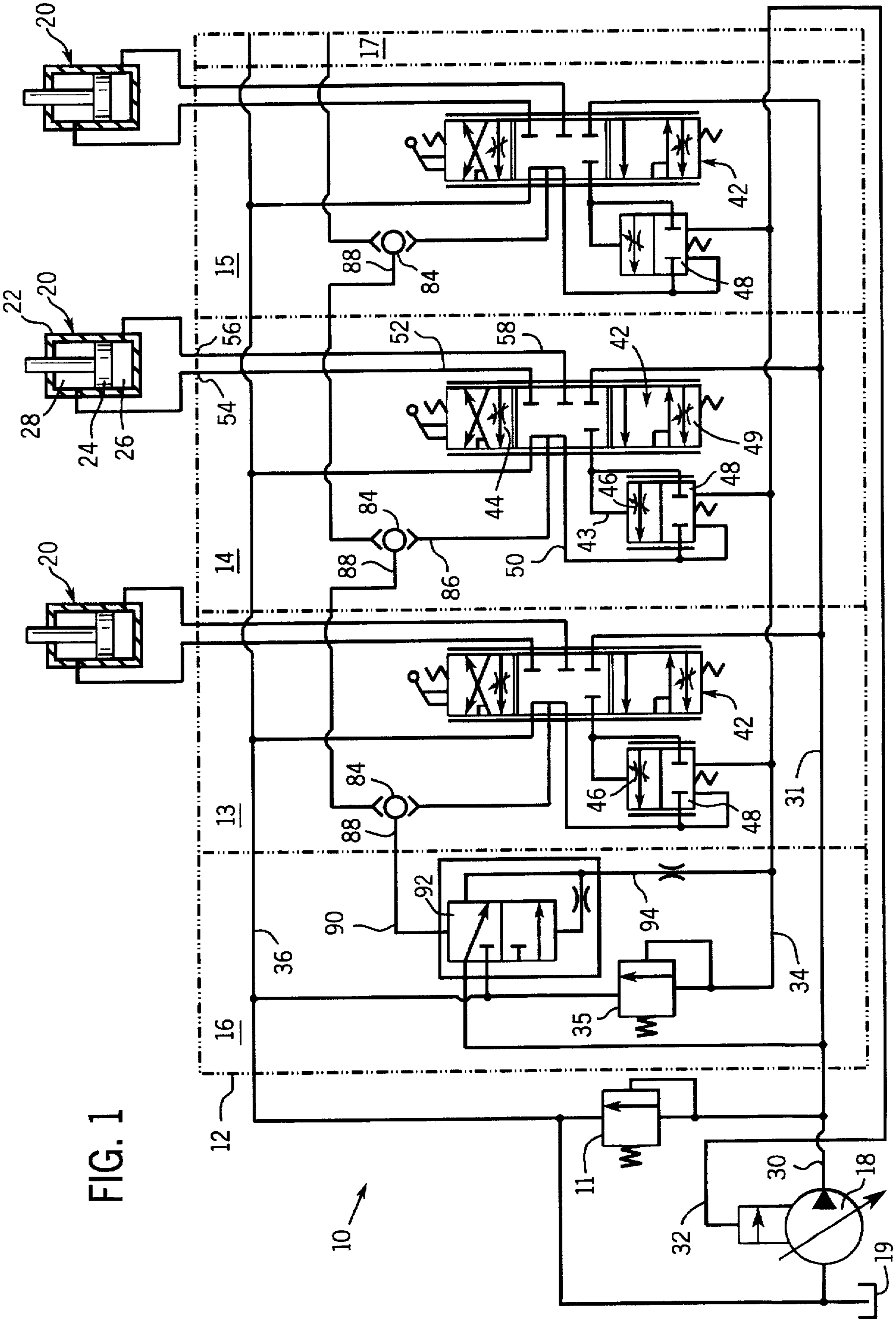
FIG. 1 a schematic diagram of a hydraulic system with a multiple valve assembly which incorporates a novel split compensator according to the present invention.
Figure 2:
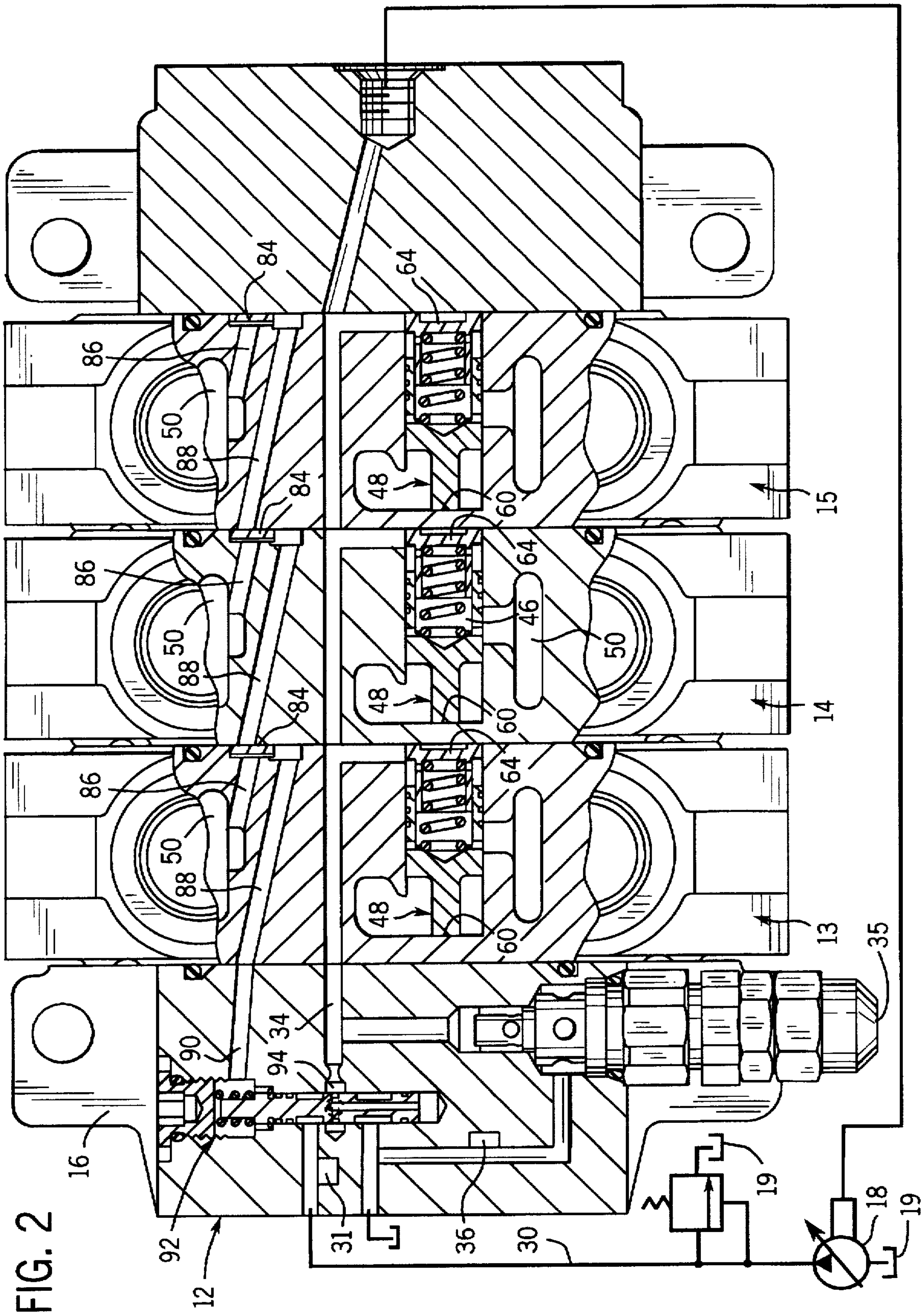
FIG. 2 is a cross-sectional view through the multiple valve assembly which is shown schematically connected to a pump and a tank.

FIG. 1 schematically depicts a hydraulic system 10 having a multiple valve assembly 12 which controls all motion of hydraulically powered working members of a machine, such as the boom and bucket of a backhoe. The physical structure of the valve assembly 12, as shown in FIG. 2, comprises several individual valve sections 13, 14 and 15 interconnected side-by-side between two end sections 16 and 17. A given valve section 13, 14 or 15 controls the flow of hydraulic fluid from a pump 18 to one of several actuators 20 connected to the working members and controls the return of the fluid to a reservoir or tank 19. The output of pump 18 is protected by a pressure relief valve 11. Each actuator 20 has a cylinder housing 22 within which is a piston 24 that divides the housing interior into a bottom chamber 26 and a top chamber 28. References herein to directional relationships and movement, such as top and bottom or up and down, refer to the relationship and movement of the components in the orientation illustrated in the drawings, which may not be the orientation of the components in a particular application.

The pump 18 typically is located remotely from the valve assembly 12 and is connected by a supply conduit or hose 30 to a supply passage 31 extending through the valve assembly 12. The pump 18 is a variable displacement type whose output pressure is designed to be the sum of the pressure at a displacement control input port 32 plus a constant pressure, known as the "margin." The control port 32 is connected to a transfer passage 34 that extends through the sections 13–15 of the valve assembly 12. A reservoir passage 36 also extends through the valve assembly 12 and is coupled to the tank 19. End section 16 of the valve assembly 12 contains ports for connecting the supply passage 31 to the pump 18 and the reservoir passage 36 to the tank 19. This end section 16 also includes a pressure relief valve 35 that relieves excessive pressure in the pump control transfer passage 34 to the tank 19. The other end section 17 has a port by which the transfer passage 34 is connected to the control input port of pump 18.

To facilitate understanding of the invention claimed herein, it is useful to describe basic fluid flow paths with respect to one of the valve sections 14 in the illustrated embodiment. Each of the valve sections 13–15 in the assembly 12 operates similarly, and the following description is applicable to them.

Figure 3:
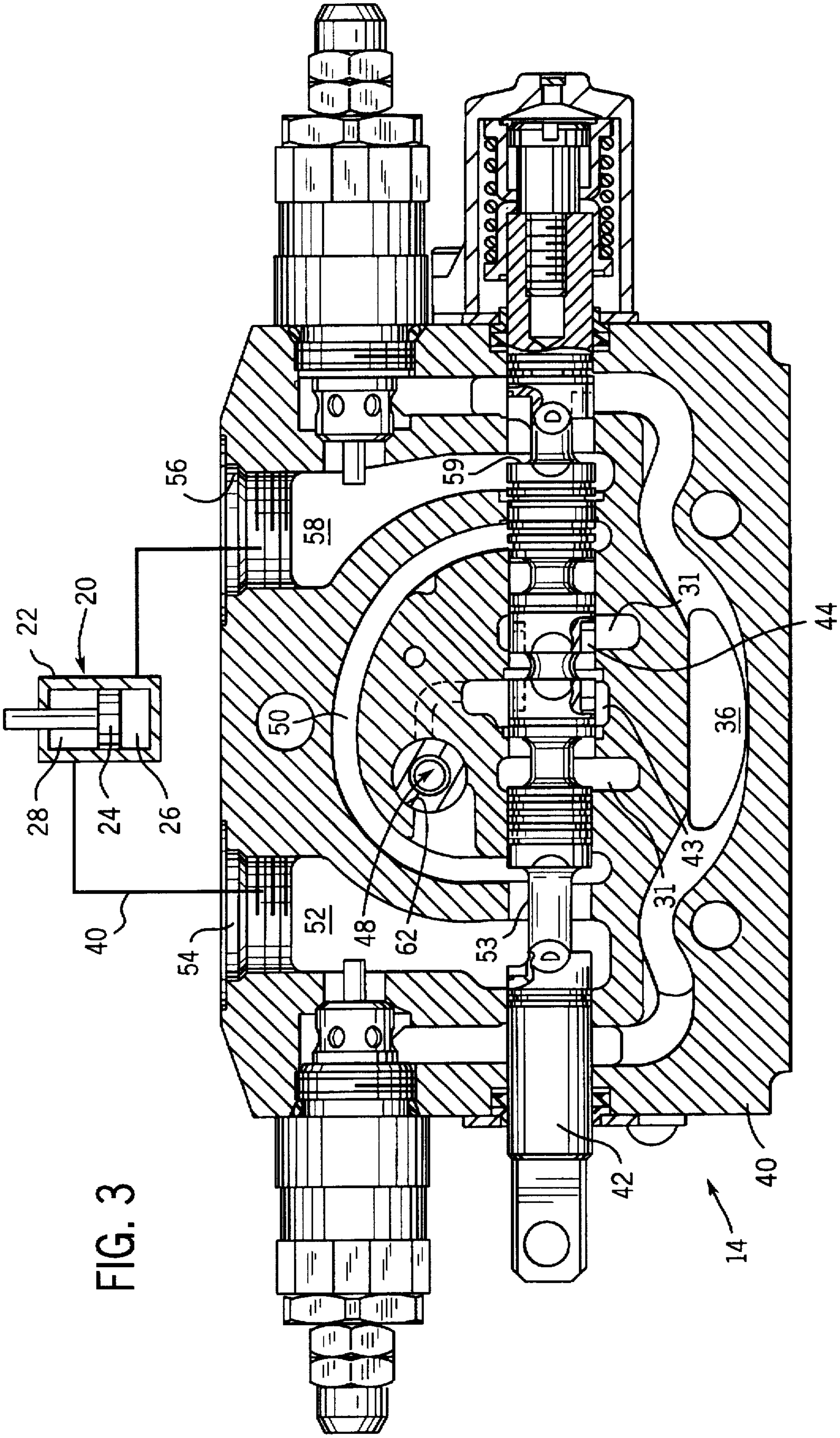
FIG. 3 is an orthogonal cross-sectional view through one section of the multiple valve assembly in FIG. 2 and schematically shows connection to a hydraulic cylinder.

With additional reference to FIG. 3, the valve section 14 has a body 40 and control shaft 42 which a machine operator can move in either reciprocal direction within a bore in the body by operating a control member that may be attached thereto, but which is not shown. Depending on which way the control shaft 42 is moved, hydraulic fluid, or oil, is directed to the bottom or top chamber 26 and 28 of a cylinder housing 22 and thereby drives the piston 24 up or down, respectively. The extent to which the machine operator moves the control shaft 42 determines the speed of a working member connected to the piston 24.

To lower the piston 24, the machine operator moves the control shaft 42 rightward into the position illustrated in FIG. 3. This opens passages which allow the pump 18 (under the control of the load sensing network to be described later) to draw hydraulic fluid from the tank 19 and force the fluid through pump output conduit 30, into a supply passage 31 in the body 40. From the supply passage 31 the hydraulic fluid passes through a metering orifice formed by a set of notches 44 of the control shaft 42, through feeder passage 43 and through a variable orifice 46 (see FIG. 2) formed by the relative position between a pressure compensating check valve 48 and an opening in the body 40 to the bridge passage 50. In the open state of pressure compensating check valve 48, the hydraulic fluid travels through a bridge passage 50, a passage 53 of the control shaft 42 and then through workport passage 52, out of work port 54 and into the upper chamber 28 of the cylinder housing 22. The pressure thus transmitted to the top of the piston 24 causes it to move downward, which forces hydraulic fluid out of the bottom chamber 26 of the cylinder housing 22. This exiting hydraulic fluid flows into another workport 56, through the workport passage 58, the control shaft 42 via passage 59 and the reservoir passage 36 that is coupled to the fluid tank 19.

To move the piston 24 upward, the machine operator moves control shaft 42 to the left, which opens a corresponding set of passages so that the pump 18 forces hydraulic fluid into the bottom chamber 26, and push fluid out of the top chamber 28 of cylinder housing 22, causing piston 24 to move upward.

In the absence of a pressure compensation mechanism, the machine operator would have difficulty controlling the speed of the piston 24. The difficulty results from the speed of piston movement being directly related to the hydraulic fluid flow rate, which is determined primarily by two variables—the cross sectional areas of the most restrictive orifices in the flow path and the pressure drops across those orifices. One of the most restrictive orifices is the metering notch 44 of the control shaft 42 and the machine operator is able to control the cross sectional area of that orifice by moving the control shaft. Although this controls one variable which helps determine the flow rate, it provides less than optimum control because flow rate is also directly proportional to the square root of the total pressure drop in the system, which occurs primarily across metering notch 44 of the control shaft 42. For example, adding material into the bucket of a backhoe might increase pressure in the bottom cylinder chamber 26, which would reduce the difference between that load pressure and the pressure provided by the pump 18. Without pressure compensation, this reduction of the total pressure drop would reduce the flow rate and thereby reduce the speed of the piston 24 even if the machine operator holds the metering notch 44 at a constant cross sectional area.

Figure 4:
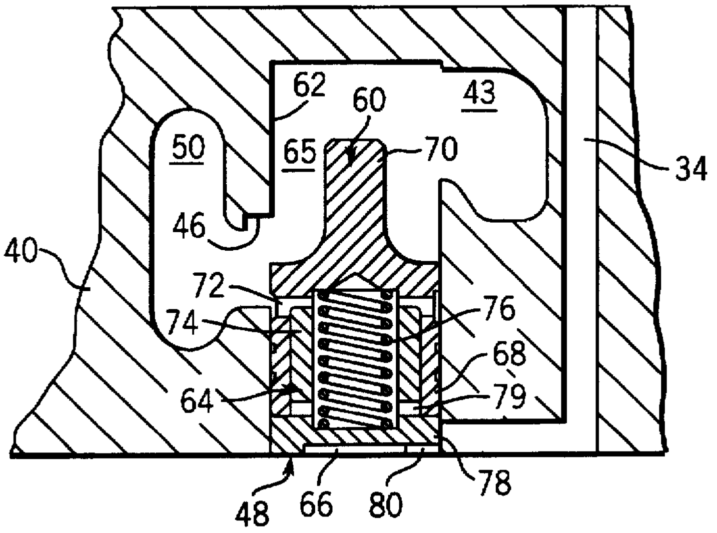
FIGS. 4, 5 and 6 are enlarged cross-sectional views of a cut-away section of FIG. 3 showing a first version compensator in three different operational states.

The present invention relates to a pressure compensation mechanism that is based upon a separate check valve 48 in each valve section 13–15. With reference to FIGS. 2 and 4, the pressure compensating check valve 48 has a spool 60 and a piston 64 both of which sealingly slide reciprocally in a bore 62 of the valve body 40. The spool 60 and a piston 64 divide the bore 62 into variable volume first and second chambers 65 and 66 at opposite ends of the bore. The first chamber 65 is in communication with feeder passage 43, while the second chamber 66 communicates with the transfer passage 34 connected to the pump control port 32. The spool 60 is unbiased with respect to the end of the bore 62 which defines the first chamber 65 and the piston 64 is unbiased with respect to the end of the bore which defines the second chamber 66. As used herein, "unbiased" refers to the lack of a mechanical device, such as a spring, which would exert force on the spool or piston thereby urging that component away from the respective end of the bore. As will be described, the absence of such a biasing device results in only the pressure within the first chamber 65 urging the spool 60 away from the adjacent end of the bore 62 and only the pressure within the second chamber 66 urging the piston 64 away from the opposite bore end.

The spool 60 has a tubular section 68 with an open end and a closed end from which extends a reduced diameter stop shaft 70. The tubular section 68 has a transverse aperture 72 which provides continuous communication between the bridge passage 50 and the interior of the tubular section 68 regardless of the position of the spool 60. The piston 64 has a tubular portion 74 with an open end slidably received within the tubular section 68 of the spool 60. A relatively weak spring 76 within the tubular portion 74 biases the spool 60 and piston 64 apart. The sliding of the piston tubular portion 74 within the spool 60 guides their movement and prevents the piston from canting and sticking within the bore 62. The tubular portion 74 of the piston 64 has a lateral aperture 79 and a closed end with an exterior flange 78 that sealingly and slideably engages bore 62 in the valve body 40. The closed end of the piston's tubular portion 74 has an exterior recess 80 through which the transfer passage 34 communicates with the second chamber 66 in the state of the pressure compensating check valve 48 shown in FIG. 4.

Referring again to FIG. 1, the pressure compensation mechanism senses the pressure at each powered workport of every valve section 13–15 in the multiple valve assembly 12, and selects the greatest of these workport pressures to be applied to the displacement control port 32 of the hydraulic pump 18. This selection is performed by a chain of shuttle valves 84, each of which is in a different valve section 13 and 14. Referring also to the exemplary valve section 14 shown in FIGS. 1 and 2, the inputs to its shuttle valve 84 are (a) the bridge 50 (via shuttle passage 86) and (b) the through passage 88 from the upstream valve section 15 which has the powered workport pressures in the valves sections that are upstream from middle valve section 14. The bridge 50 sees the pressure at whichever workport 54 or 56 is powered, or the pressure of reservoir passage 36 when the control shaft 42 is in neutral. The shuttle valve 84 operates to transmit the greater of the pressures at inputs (a) and (b) via its section's through passage 88 to the shuttle valve of the adjacent downstream valve section 13. It should be noted that the farthest upstream valve section 15 in the chain need not have a shuttle valve as only its load pressure will be sent to the next valve section 14 via passage 88. However, all valve sections 13–15 are identical for economy of manufacture.

As shown in FIGS. 1 and 2, the through passage 88 of the farthest downstream valve section 13 in the chain of shuttle valves 84 opens into the input 90 of an isolator 92. Therefore, in the manner just described, the greatest of all the powered workport pressures in the valve assembly 12 is transmitted to the input 90 of the isolator 92 which produces the greatest workport pressure at its output 94. The pressure transmitted to the isolator 90 is a first load-dependent pressure, and the pressure transmitted from the isolator output 94 is a second load-dependent pressure. The pressure at isolator output 94 is applied to the control input 32 of the pump 18 via the transfer passage 34 and by means of that transfer passage to the second chamber 66 of each pressure compensating check valve 48, thereby exerting the isolator output pressure on the closed end of check valve piston 64.

In order for hydraulic fluid to flow from the pump 18 to the powered workport 54 or 56, the variable orifice 46 through the pressure compensating check valve 48 must be at least partially open. For this to occur, the spool 60 must be moved downward to open communication between the first chamber 65 and the bridge passage 50, as shown in FIG. 4. The illustrated spool position occurs when the associated valve section either is the only one being activated by the machine operator or is the one with the greatest load pressure. In that circumstance, the pump pressure in feeder passage 43 is slightly greater than the load sense pressure in transfer passage 34 thereby forcing the spool 60 against the piston 64 which in turn is driven against the adjacent end of bore 62. This action opens the variable orifice 46 to the full extent.

Figure 5:
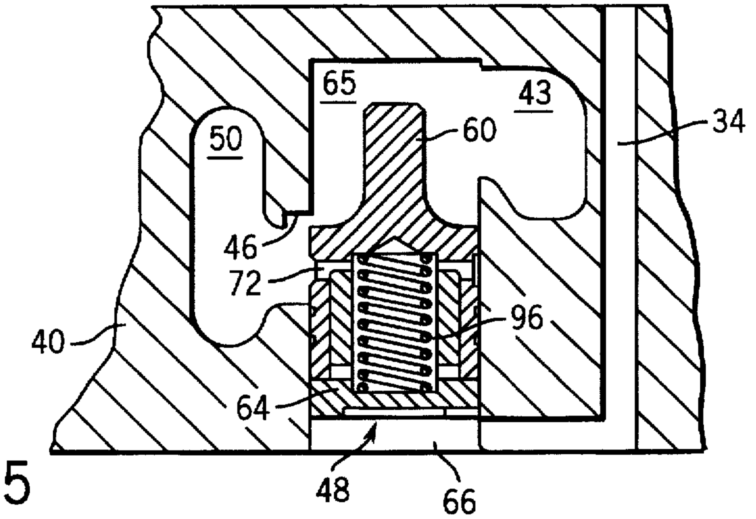

With reference to FIG. 5, when a particular valve section 13, 14 or 15 is not the one with the greatest load pressure, the variable orifice 46 will be less than fully open. This occurs when the pump pressure in feeder passage 43 is less than the load sense pressure in transfer passage 34. As a consequence the pressure in the second chamber 66 of the pressure compensating check valve 48 will be greater than the pressure in the first chamber 65, thereby moving the spool 60 and piston 64 upward in the figure reducing the size of the orifice 46.

Because the bottom of the piston 66 has the same surface area as the top of spool 60, fluid flow is throttled at orifice 46 so that the pressure in the first chamber 65 of compensation valve 48 is approximately equal to the greatest workport pressure in the second chamber 66. This pressure is communicated to one side of metering notch 44 via feeder passage 43 in FIG. 3. The other side of metering notch 44 is in communication with supply passage 31, which receives the pump output pressure that is equal to the greatest workport pressure plus the constant margin pressure. As a result, the pressure drop across the metering notch 44 is equal to the margin pressure. Changes in the greatest workport pressure are seen both at the supply side (passage 31) of metering notch 44 and at the second chamber 66 of pressure compensating check valve. In reaction to such changes, the spool 60 and piston 64 find balanced positions in the bore 62 so that the margin pressure is maintained across metering notch 44.

Figure 6:
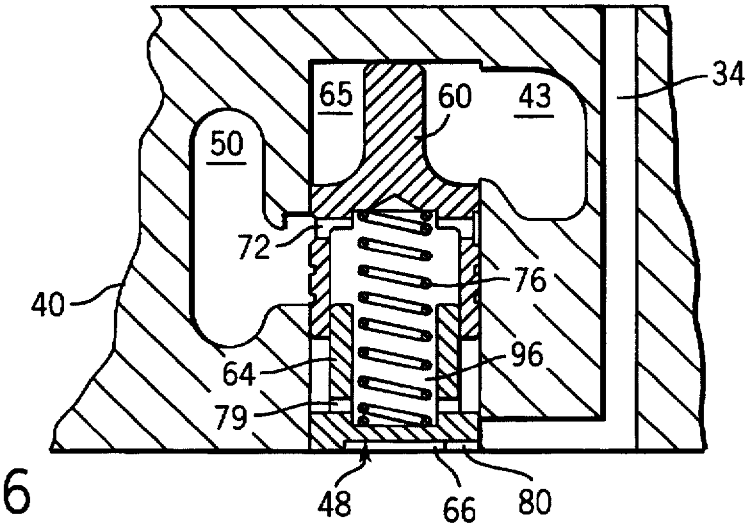

FIG. 6 depicts another state of pressure compensating check valve 48 which occurs in either of two conditions. The first is when all the control shafts 42 are in the neutral (centered) position and the valve is closed. The second condition occurs in the load powered state when workport pressure at this valve section (e.g. 14) is greater than the supply pressure in feeder passage 43, as happens when a heavy load is applied to the associated actuator 20, commonly referred to as "craning" with respect to off-road equipment. This latter condition can result in hydraulic fluid being forced from the actuator 20 back through the corresponding valve section to the pump outlet. However the split pressure compensating check valve 48 prevents this reverse flow from occurring by closing that flow path. In this latter case, the excessive load pressure appears in the bridge 50 and is communicated through the transverse aperture 72 in the spool 60 to the intermediate cavity 96 within the spool and the piston 64. Because the resultant pressure in the intermediate cavity 96 is greater than the pressure both the feeder passage 43 and the transfer passage 34, the spool 60 and piston 64 are forced apart expanding the variable volume intermediate cavity and closing the orifice 46 entirely which blocks the reverse flow through the valve section. In this state, the piston abuts the adjacent end of bore 65 and the stop shaft 70 of the spool 60 strikes the opposite bore end at which position the tubular section 68 fully closes the variable orifice 46. The craning condition can be removed by reversing the process that created it.

Figure 7:
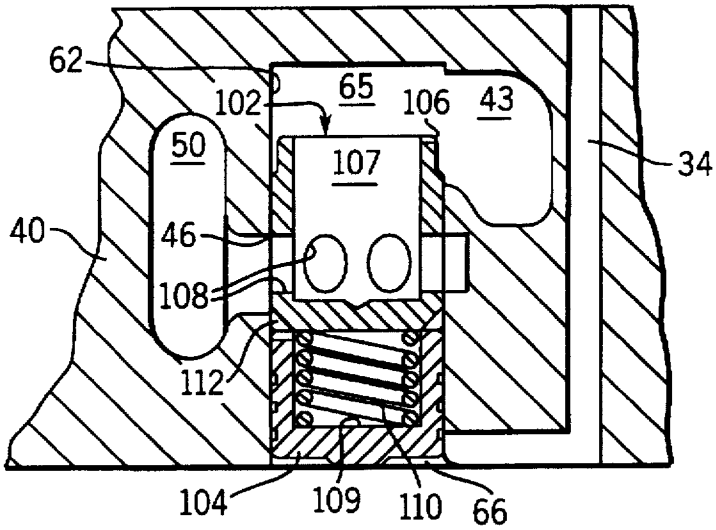
FIGS. 7, 8 and 9 are enlarged cross-sectional views similar to FIGS. 4–6 showing a second version of the compensator in the three different operational states.
Figure 8:
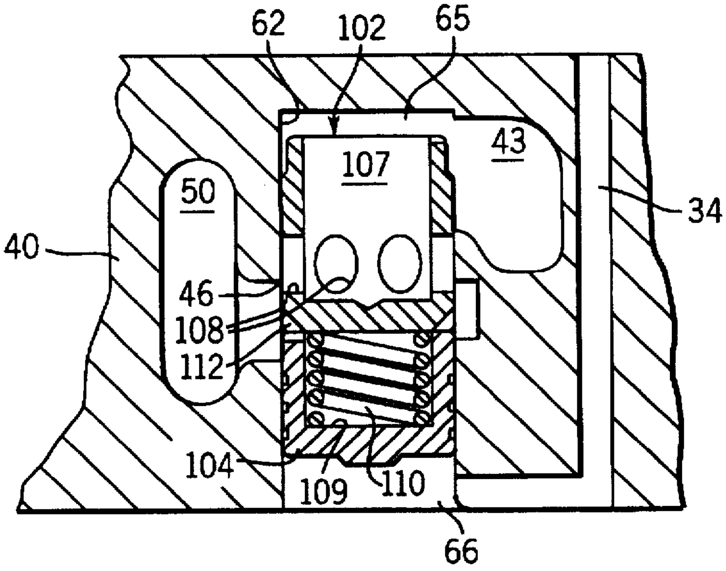
Figure 9:
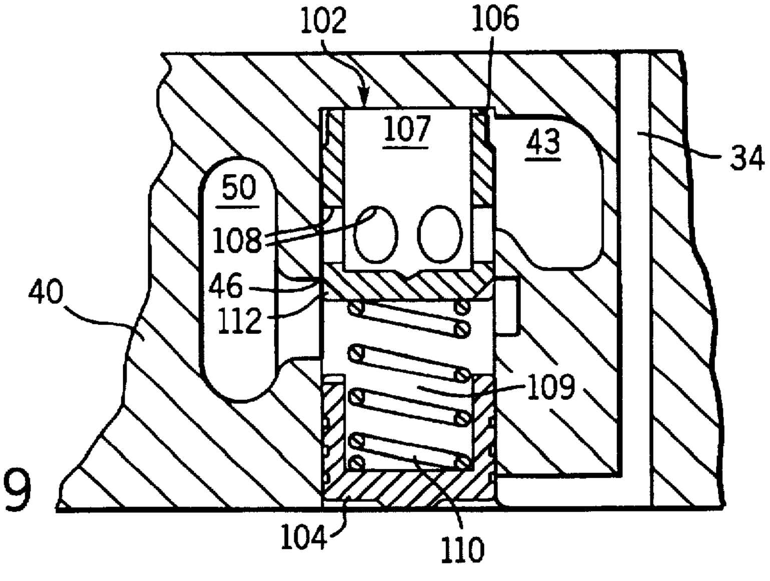

FIGS. 7, 8 and 9 show a second version 100 of the compensator 48 in the three different operational states depicted in FIGS. 4, 5 and 6, respectively. In this version the spool 102 and the piston 104 do not slide within each other as in the first version. The spool and piston assembly divide valve bore 62 into first chamber 65 in communication with feeder passage 43 and second chamber 66 in communication with the transfer passage 34 connected to the pump control port 32.

Spool 102 is cup-shaped with an open end communicating with the feeder passage 43. The spool 102 has a central bore 107 with lateral apertures 108 in a side wall which together form a path through the compensator 48 between the feeder passage 43 and the bridge 50 when the valve is in the state illustrated in FIG. 7. The variable orifice 46 is formed by the relative position between the lateral apertures 108 of the spool 102 and an opening in the body 40 to bridge passage 50.

The piston 104 also has a cup-shape with the open end facing the closed end of the spool 102 and defining an intermediate cavity 109 between the closed end of the spool and piston. The exterior corner 112 of the closed end of the spool 102 is bevelled such that the intermediate cavity 109 is always in communication with the bridge 50 even when the piston abuts the spool 102 as shown in FIGS. 7 and 8. A spring 110, located in the intermediate cavity 109, exerts a relatively weak force which separates the spool and piston when the system is not pressurized.

The spool 102 and piston 104 respond to pressure differentials among the transfer passage 34, the feeder passage 43 and the bridge passage 50 in the same manner as described with respect to the first version in FIG. 4–6.

Figure 10:
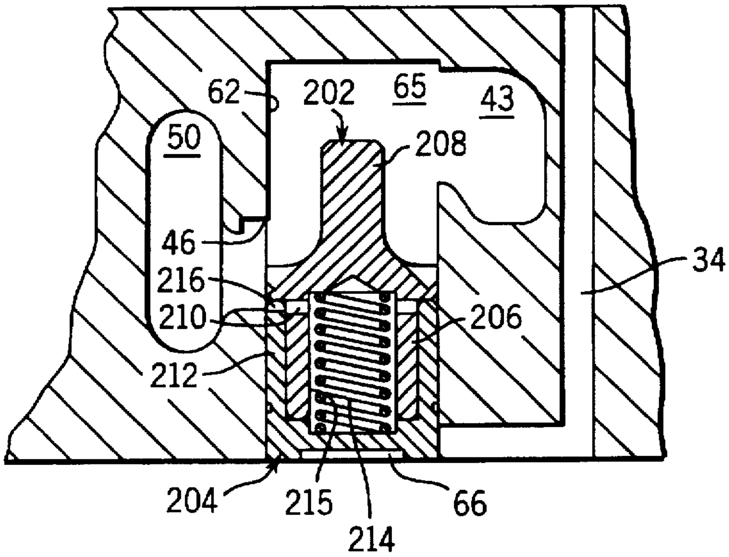
FIGS. 10, 11 and 12 are enlarged cross-sectional views similar to FIGS. 4–6 showing a third version of the compensator in the three different operational states.
Figure 11:
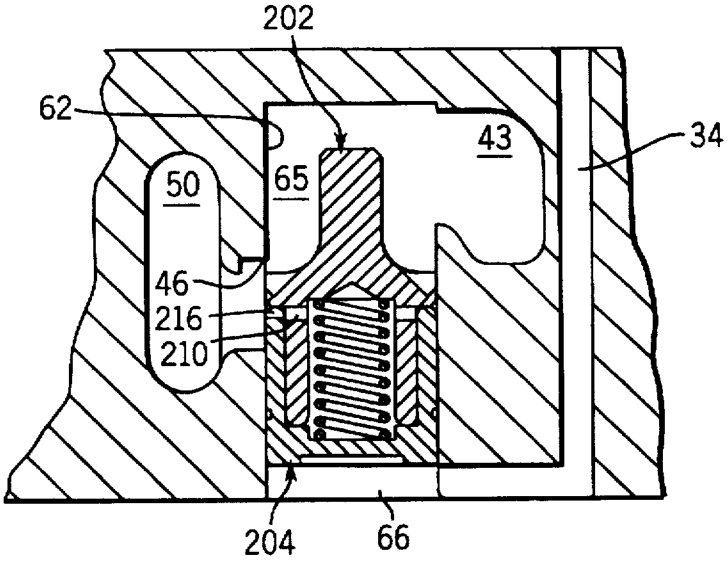
Figure 12:
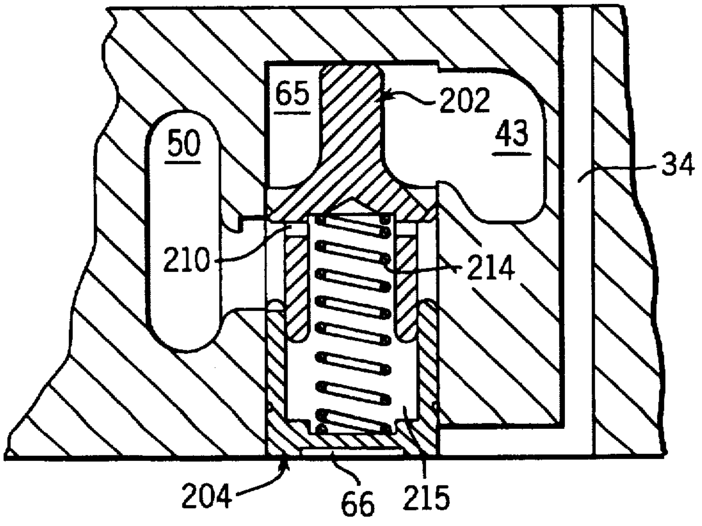

FIGS. 10, 11 and 12 show a third version 200 of the pressure compensating check valve in the three different operational states depicted for the first version in FIGS. 4, 5 and 6, respectively. As with the first version 48, the third version has a spool 202 and a piston 204 which slide within each other. The spool and piston assembly divide valve bore 62 into first chamber 65 in communication with feeder passage 43 and second chamber 66 in communication with the transfer passage 34 connected to the pump control port 32.

The spool 202 has a tubular section 206 with an open end and a closed end from which extends a reduced diameter stop shaft 208. The tubular section 206 has a transverse aperture 210 which provides continuous communication between the bridge passage 50 and the interior of the tubular section 206 regardless of the position of the spool 202. The piston 204 is cup-shaped with a tubular portion 212 that has an open end within which the tubular section 206 of the spool 202 is slidably received. A relatively weak spring 214, located within an intermediate cavity 215 within the spool tubular section 206, biases the spool 202 and piston 204 apart. The sliding of the spool tubular section 206 within the piston 204 guides their movement and prevents the piston from canting and sticking within the bore 62. The tubular portion 212 of the piston 204 has a lateral aperture 216 that cooperates with spool aperture 210 to provide a fluid path between the bridge 50 and the intermediate cavity 215.

The spool 202 and piston 204 respond to pressure differentials among the transfer passage 34, the feeder passage 43 and the bridge passage 50 in the same manner as described with respect to the first version in FIGS. 4–6.

We claim:

1. In a hydraulic system having an array of valve sections for controlling flow of hydraulic fluid from a pump to a plurality of actuators, each valve section having a workport to which one actuator connects and having a metering orifice through which the hydraulic fluid flows from the pump to the one actuator, the pump being of the type which produces an output pressure that is a constant amount greater than a pressure at a control input, the array of valve sections being of the type in which the greatest pressure among the workports is sensed to provide a load sense pressure that is transmitted to the control input; the improvement comprising:

within at least one valve section, a pressure compensating valve having a spool and a piston slidably located in a bore thereby defining first and second chambers at opposite ends of the bore, the spool and piston having an intermediate cavity therebetween and biased apart by a spring in the intermediate cavity, the spool and piston being unbiased by any spring with respect to the opposite ends of the bore, the first chamber being in communication with the metering orifice and the second chamber being in communication with the load sense pressure wherein a pressure differential between the first and second chambers and a force exerted by the spring determines a position of the spool within the bore, the bore and the spool defining a variable orifice through which fluid is supplied from the first chamber to a conduit connected to the one actuator and the position of the spool determining a size of the variable orifice, whereby a greater pressure in the first chamber than in the second chamber enlarges the size of the variable orifice and a greater pressure in the second chamber than in the first chamber reduces the size of the variable orifice, and further wherein one of the spool and the piston has a passage through which the intermediate cavity communicates with the conduit so that when hydraulic pressure exerted by the one actuator is greater than pressures in the first and second chambers, the piston and the spool are forced apart to block flow of the hydraulic fluid between the one actuator and the first chamber.

2. The hydraulic system as recited in claim 1 wherein:

the spool has a tubular section with an open end and a closed end; and the piston has a tubular portion with a closed end and an open end slidably received within the tubular section of the spool, wherein the tubular portion and the tubular section define the intermediate cavity.

3. The hydraulic system as recited in claim 2 wherein the spool has stop shaft extending outward from the closed end of the tubular section.

4. The hydraulic system as recited in claim 2 wherein the tubular section of the spool has a transverse aperture which provides continuous communication between the conduit and the intermediate cavity regardless of the position of the spool within the bore.

5. The hydraulic system as recited in claim 1 wherein:

the spool has a tubular shape with closed end and an open end which faces the first chamber; and the piston has a tubular shape with a closed end and an open end which faces the spool, wherein the intermediate cavity is formed between the closed end of the spool and the closed end of the piston.

6. The hydraulic system as recited in claim 5 wherein the bore has an opening connected to the conduit and the spool has a lateral aperture which cooperates with the opening to define the size of the variable orifice.

7. The hydraulic system as recited in claim 1 further comprising a chain of shuttle valves coupled to the conduit in each valve section for selecting the greatest pressure among the workports of the hydraulic system.

8. The hydraulic system as recited in claim 7 wherein each valve section further comprises a shuttle valve having an output, a first input connected to the first chamber, and a second input connected the output of a shuttle valve in a different valve section of the hydraulic system.

9. The hydraulic system as recited in claim 7 further comprising an isolator, coupled to chain of shuttle valves to receive the greatest pressure among the workports, for transmitting that greatest pressure to the control input of the pump while blocking the flow of fluid from the chain of shuttle valves to the control input.

10. The hydraulic system as recited in claim 1 wherein:

the piston has a tubular portion with a closed end and an open end;

the spool has a tubular section with a closed end and an open end slidably received within the tubular portion of the spool, wherein the tubular portion and the tubular section define the intermediate cavity.

11. The hydraulic system as recited in claim 10 wherein the spool has stop shaft extending outward from the closed end of the tubular section.

12. The hydraulic system as recited in claim 10 wherein the tubular section of the spool has a transverse aperture which provides continuous communication between the conduit and the intermediate cavity regardless of the position of the spool within the bore.

13. A hydraulic valve mechanism for enabling an operator to control the flow of pressurized fluid in a fluid path from a variable displacement hydraulic pump to an actuator which is subjected to a load force that creates a load pressure, the pump having a control input and producing an output pressure which is a constant amount greater than a control input pressure, the hydraulic valve mechanism comprising:

(a) a first valve element and a second valve element juxtaposed to provide between them a metering orifice in the fluid path, at least one of the valve elements being movable under control of an operator to vary a size of the metering orifice and thereby to control flow of fluid to the actuator;

(b) a sensor for sensing the load pressure and applying the load pressure to the control input of the pump; and (c) pressure compensator for maintaining across the metering orifice a pressure drop substantially equal to the constant amount, the pressure compensator having a spool and a piston slidably located in a bore thereby defining first and second chambers at opposite ends of the bore, the spool and piston being biased apart by a spring in an intermediate cavity and being unbiased by any spring with respect to the opposite ends of the bore, the first chamber being in communication with the metering orifice and the second chamber receiving the load pressure sensed by the sensor wherein a pressure differential between the first and second chambers determines a position of the spool and piston within the bore, the bore having an orifice connected to a conduit through which fluid is supplied to the actuator, whereby a greater pressure in the first chamber than in the second chamber causes movement of the spool which enlarges the size of the orifice and a greater pressure in the second chamber than in the first chamber causes movement of the spool which reduces the size of the orifice, and further wherein one of the spool and the piston has a passage through which the intermediate cavity communicates with the orifice so that when a pressure exerted at the orifice by the one actuator is greater than pressure in the first and second chambers, the piston and spool are moved apart to block flow of fluid between the orifice and the first chamber.

14. The hydraulic valve mechanism as recited in claim 13 wherein:

the spool has a tubular section with an open end and a closed end; and the piston has a tubular portion with a closed end and an open end slidably received within the tubular section of the spool, wherein the tubular portion and the tubular section define the intermediate cavity.

15. The hydraulic valve mechanism as recited in claim 14 wherein the spool has stop shaft extending outward from the closed end of the tubular section.

16. The hydraulic valve mechanism as recited in claim 14 wherein the tubular section of the spool has a transverse aperture which provides continuous communication between the conduit and the intermediate cavity regardless of the position of the spool within the bore.

17. The hydraulic valve mechanism as recited in claim 13 wherein:

the spool has a tubular shape with closed end and an open end which faces the first chamber; and the piston has a tubular shape with a closed end and an open end which faces the spool, wherein the intermediate cavity is formed between the closed end of the spool and the closed end of the piston.

18. The hydraulic valve mechanism as recited in claim 17 wherein the bore has an opening connected to the conduit and the spool has a lateral aperture which cooperates with the opening to define the size of the variable orifice.

19. The hydraulic valve mechanism as recited in claim 13 wherein:

the piston has a tubular portion with a closed end and an open end;

the spool has a tubular section with a closed end and an open end slidably received within the tubular section of the spool, wherein the tubular portion and the tubular section define the intermediate cavity.

20. The hydraulic valve mechanism as recited in claim 13 wherein the spool has stop shaft extending outward from the closed end of the tubular section.

21. The hydraulic valve mechanism as recited in claim 13 wherein the tubular section of the spool has a transverse aperture which provides continuous communication between the conduit and the intermediate cavity regardless of the position of the spool within the bore.

* * * * *